May 9, 1961   J. OTT   2,983,348
POWER PRESSES
Filed July 31, 1956   4 Sheets-Sheet 1

INVENTOR
JOSEF OTT

May 9, 1961 J. OTT 2,983,348
POWER PRESSES
Filed July 31, 1956 4 Sheets-Sheet 2

INVENTOR
JOSEF OTT
BY Leon M. Strauss

May 9, 1961 J. OTT 2,983,348
POWER PRESSES
Filed July 31, 1956 4 Sheets-Sheet 3

INVENTOR.
JOSEF OTT
BY
Leon M. Strauss

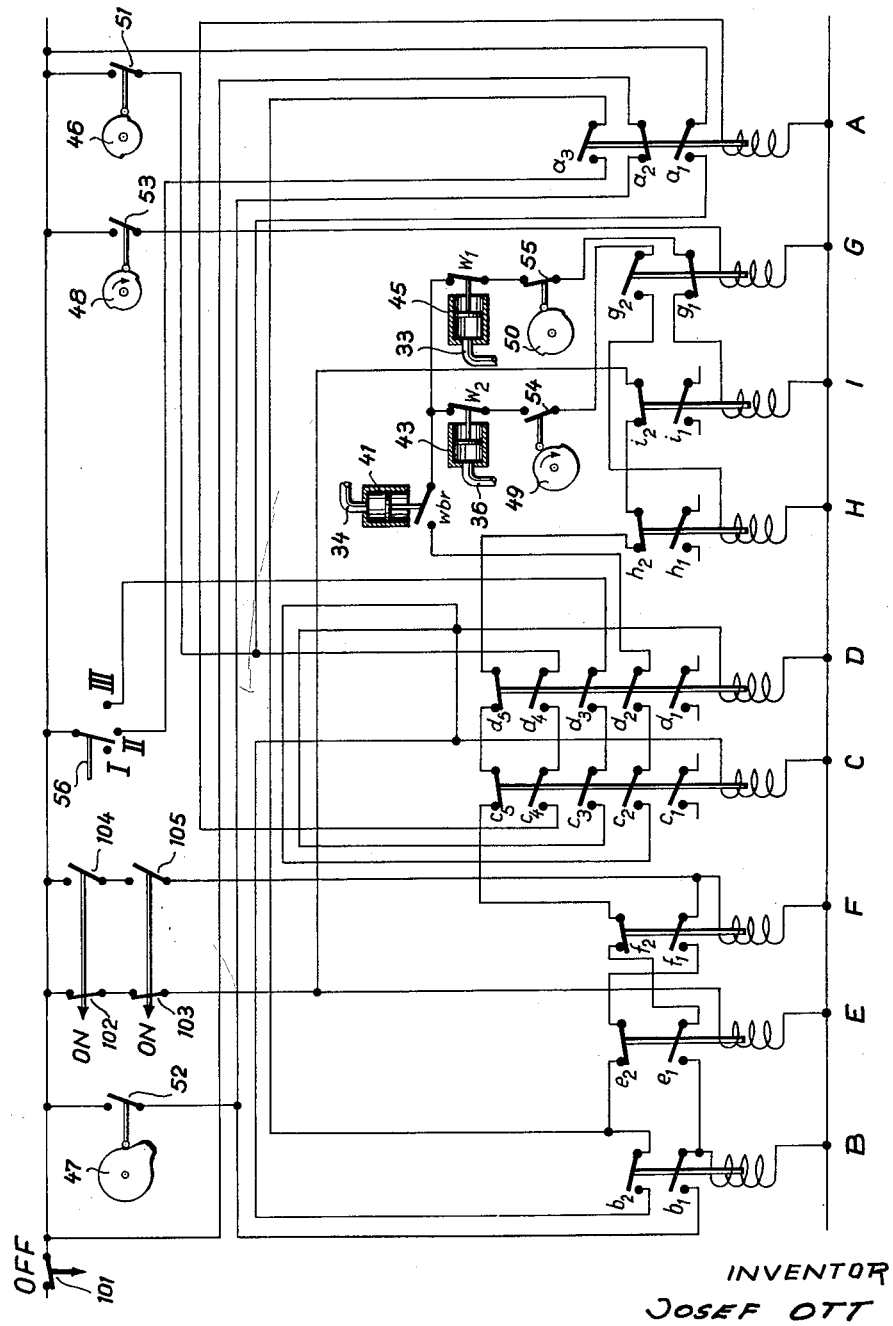

United States Patent Office 2,983,348
Patented May 9, 1961

2,983,348
POWER PRESSES

Josef Ott, Faurndau, Germany, assignor to L. Schuler A.G., Goppingen, Wurttemberg, Germany Filed July 31, 1956, Ser. No. 601,316

Claims priority, application Germany Aug. 2, 1955

7 Claims. (Cl. 192—4)

This invention relates to a power press equipped with at least one brake and at least one clutch, and especially to a press of the aforesaid type with a speed change gearing or transmission and in which the idle or return stroke of the operative element of the press is effected more rapidly than the working stroke, to each speed stage of the change gearing being coordinated individual clutch means.

The invention resides in the provision of an individual control member in association with each clutch-actuating or brake-actuating mechanism to prevent overlapping of the engagement of the various clutches or brakes, each control member being operatively connected to respective engaging means of the remaining clutches and brakes in such a manner that it blocks engagement of the remaining clutches and brakes until the clutch or brake to which said member is associated or coordinated, is itself disengaged.

It is therefore one of the objects of the present invention to provide means ensuring that premature wear and tear of the clutch or friction linings of a power press will be effectively avoided, which wear and tear occurs during engagement of the clutch, in the event that another clutch or brake has not yet been disengaged due to the inertia of the respective control member.

In one embodiment of the invention the control member is provided with a spring-biased piston subject to the pressure of a suitable pressure medium employed to actuate the clutches and/or the brakes, the piston being operatively connected to a control pin arranged to actuate at least one electric contact or switch.

The present invention further contemplates the improvement of electrically actuating the control valves for the delivery conduits through which the pressure medium flows and also to provide in the electric actuating or energizing circuit for each control valve contacts operated by pressure control devices which are not associated with or coordinated to the respective delivery conduit.

These and other objects of the invention will become further apparent from the following detailed description, reference being made to the accompanying drawings showing preferred embodiments of the invention.

In the drawings:

Figs. 4 and 5 are wiring diagrams of the electric circuits for the control mechanism;

Figures 1, 3:
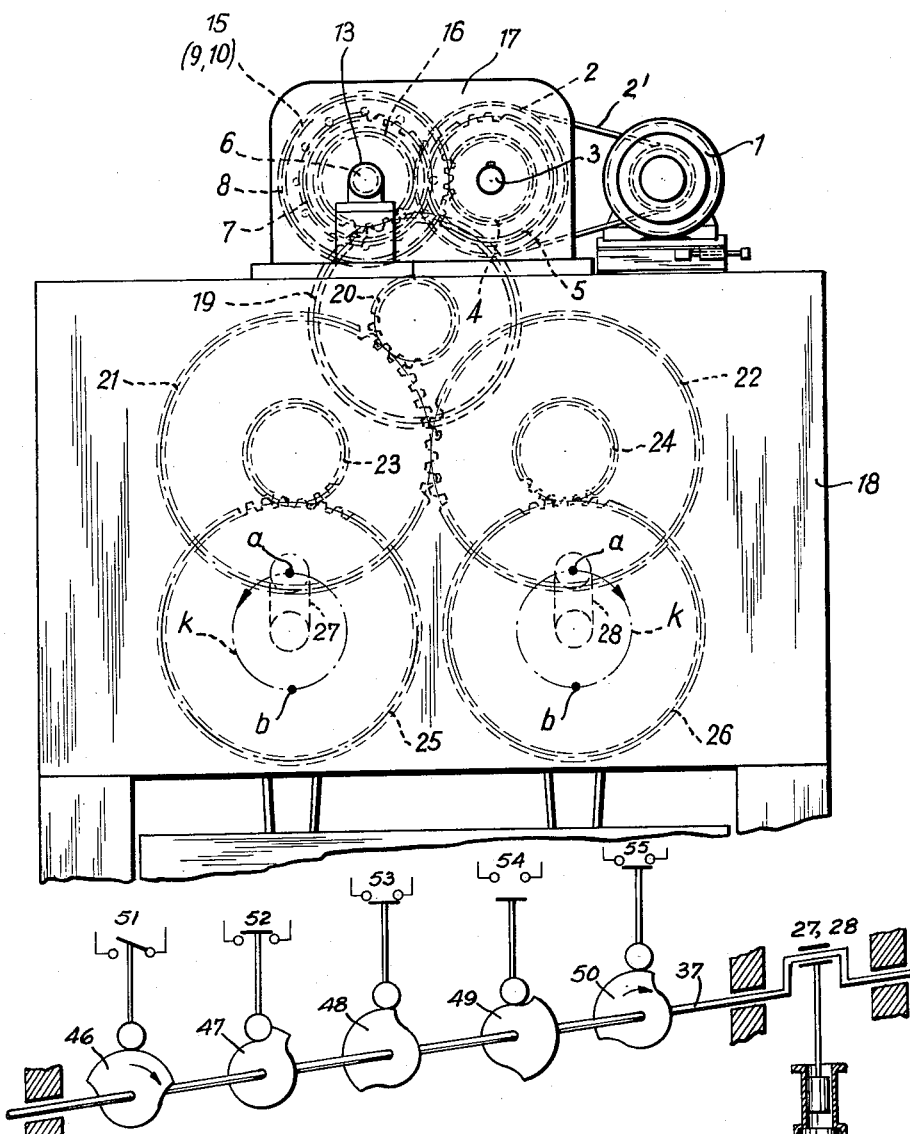
Fig. 1 is a schematic elevational view of the upper portion of a press constructed in accordance with the present invention and having a two-speed control transmission arranged on top of the press.
Fig. 3 is a schematic illustration of the control or cam shaft employed in accordance with the present invention.
Figure 2:
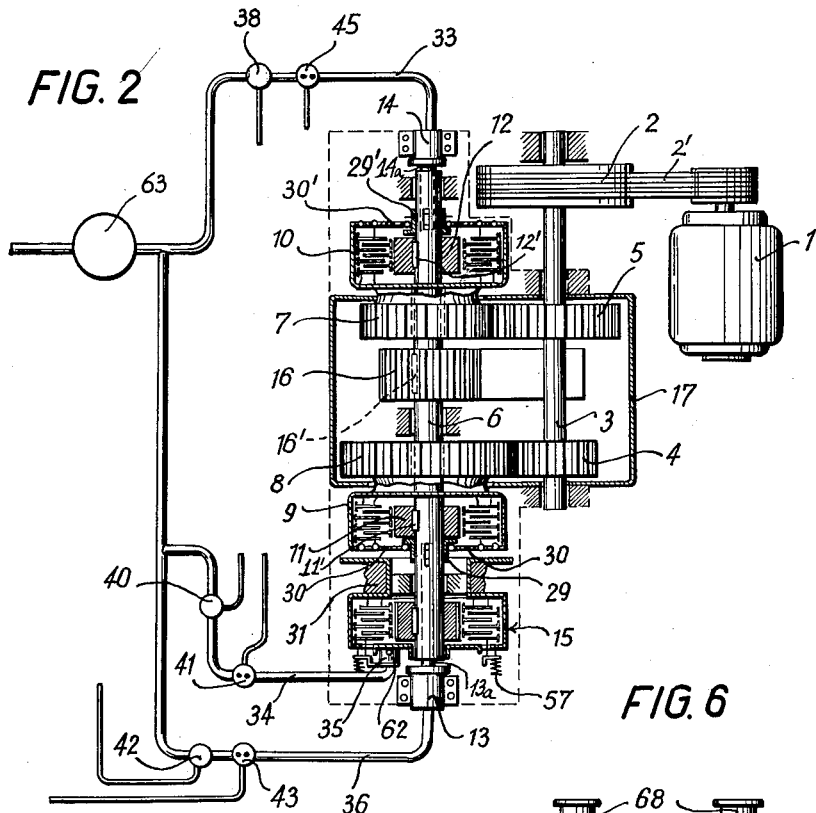
Fig. 2 is a schematic, horizontal sectional view of the control transmission employed in the invention.

Referring now more particularly to Figs. 1 and 2, there has been disclosed an electric drive motor 1 arranged on a top part 18 of the power press frame. This motor drives a flywheel 2 via V-belts 2', the flywheel 2 being fixed to an intermediate input shaft 3 of the speed change transmission 17. On the input shaft 3 are arranged axially spaced gears 4 and 5. Journaled in the transmission housing and extending parallel to the intermediate shaft 3 is an output shaft 6. Two gear wheels 7 and 8 are loosely mounted on said shaft 6, the gear wheel 7 meshing with gear 5 and the gear wheel 8 being in engagement with gear 4. The gears 5 and 7, according to the disclosed embodiment of the invention, have the same diameter and the same number of teeth, while the gear 8 has a diameter substantially greater than that of gear 4 and, of course, a correspondingly greater number of teeth. The dimensions of these various gears are so chosen that the gear 8 is rotated with approximately one half the angular speed at which the intermediate shaft 3 together with the gears 4 and 5 and thus the gear 7 are rotated.

Arranged on shaft 6 and on opposite sides of the transmission housing 17 are disc or plate clutches 9 and 10. The gear 8 is fixedly connected to the housing of the clutch 9, while gear 7 is fixedly connected with the housing of the clutch 10. Each of the housings carries in its interior one set of clutch plates or discs. Also arranged on the shaft 6 and interiorly of the clutch housings, as by means of keys 11' and 12', are disc braces 11 and 12 which support sets of clutch plates or discs associated with and extending into the spaces between the discs or plates carried by the clutch housings.

The clutches 9 and 10 may be engaged by axial displacement sleeves 29 and 29', respectively, the sleeves acting on levers 30 and 30' pivotally mounted on the clutch housings. This displacement is effected through the intermediary of pneumatic pressure cylinder devices 13 and 14 located opposite the ends of the output shaft 6. For this purpose, the latter is provided with axial bores at its opposite ends which extend up to the housings of the clutches 9 and 10. Piston rods 13a and 14a extend from the cylinders 13 and 14 into the shaft bores, respectively, and are connected with the sleeves 29 and 29', respectively, by means of connecting elements extending through transverse slots provided in the shaft 6.

Arranged adjacent one end of the shaft 6 is a disc brake 15, the fixed or stationary part of which is mounted on an external support 31 (partly shown). Threaded to the fixed brake housing is a pressure cylinder 35 in which is located a piston 62 designed for a small stroke or displacement. The piston 62 is forced by compressed air or light pressure medium in a direction opposite to the direction of action or bias of the braking force-applying springs 57, so as to disengage the first pressure disc and to thereby release the brake. Upon release of the compressed air the brake is again actuated by means of the springs 57 which are spacedly arranged with respect to each other and along the periphery of the brake.

Fixed to the output shaft 6, as by means of a key 16', is an output gear 16 which meshes with an intermediate gear 19 journaled in the press frame. The gear 19 is rigidly connected with a coaxial pinion 20 which meshes with and drives one of two meshing gears 21 and 22 having the same diameter. Rigidly connected to the gears 21 and 22, respectively, are coaxial pinions 23 and 24. The pinion 23 drives a crank element 27 through the intermediary of a gear 25, while the pinion 24 drives a crank element 28 extending parallel to the shaft 27 through the intermediary of a gear 26. The positions of the crank means 27 and 28 designated at $a$ correspond to the instant at which the press operation is started, while the crank positions at $b$ correspond to the instant at which the transmission effects a change in the speed of operation of the press.

Figure 6:
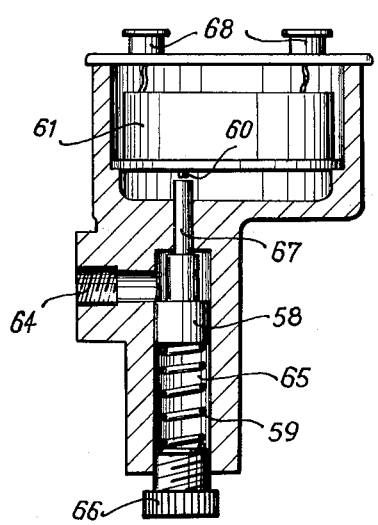
Fig. 6 is a sectional view of a pressure control device employed in accordance with the invention.
Figure 2B:
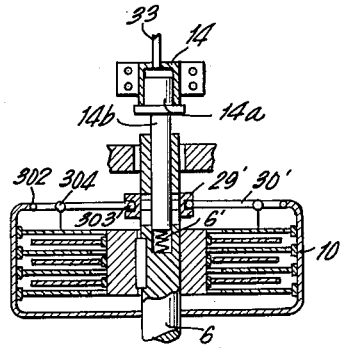
Fig. 2b is an enlarged sectional detail view further illustrating the pressure cylinder and associated elements.
Figure 2A:
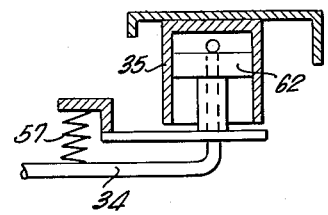
Fig. 2a is a longitudinal sectional detail view of the pressure cylinder.

The pressure cylinders 13, 14 and 35 communicate with a source of pressure 63 through pressure conduits 36, 33 and 34, respectively, in which are located electro-magnetically actuatable control valves 42, 38 and 40 of conventional construction. Associated with the conduits 33, 34 and 36 are pressure control devices 45, 41 and 43, respectively. Each of these pressure control devices, one of which is specifically illustrated in Fig. 6, is provided with a channel or passageway 64 designed to be placed in communication with the respective pressure conduit and merging with a cylindrical bore 65.

A piston 58 is reciprocally guided in the bore 65, one face of the piston being engaged or contacted by one end of a helical compression spring, the other end of which abuts against an adjustment screw 66. A piston rod 67 extending from the other face of the piston 58 actuates, when in its uppermost position as seen in Fig. 6, a micro-switch 61, of known construction, through the intermediary of a control pin 60. Electric conductors associated with the contacts of the micro-switch 61 are connected with electrically conductive terminals or clamps 68.

The pressure cylinder devices 13, 14 and 35 are controlled by means of a mechanism which includes a control or cam shaft 37 (Fig. 3) which rotates in synchronism with the cranks 27 and 28 of the press, such synchronism being, for example, obtained most advantageously by a direct connection of the shaft 37 to the crank elements 27 and 28. Mounted on the shaft 37 are cams 46, 47, 48, 49 and 50, these cams being adjustable on the shaft 37 and constructed to actuate switches 51, 52, 53, 54 and 55, respectively.

Figure 5:
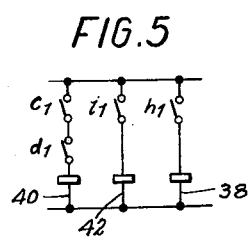

The control mechanism of the press (Fig. 4) further includes relays A, B, C, D, E, F, G, H and J, and a main switching key 56 serves for starting the operation of the press. The electric circuits associated with the control mechanism of the press are shown in Figs. 4 and 5 of the drawings, and it is to be noted, by way of explanation, that the contacts or switches associated with the various relays are designated by lower case letters corresponding to the capital letters identifying the relays.

Figure 7:
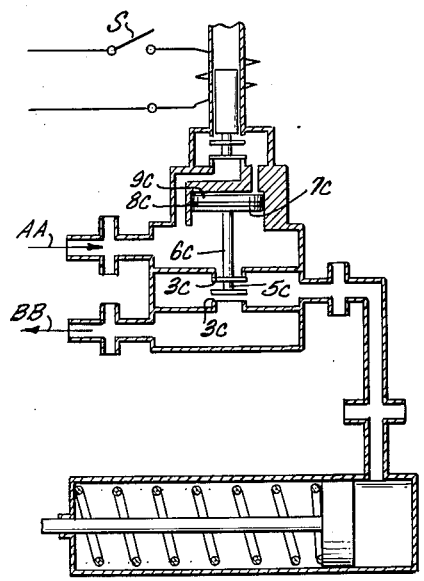
Figs. 7 and 8 are illustrations of the electromagnetic valve arrangement in inoperative and operative positions, respectively.
Figure 8:
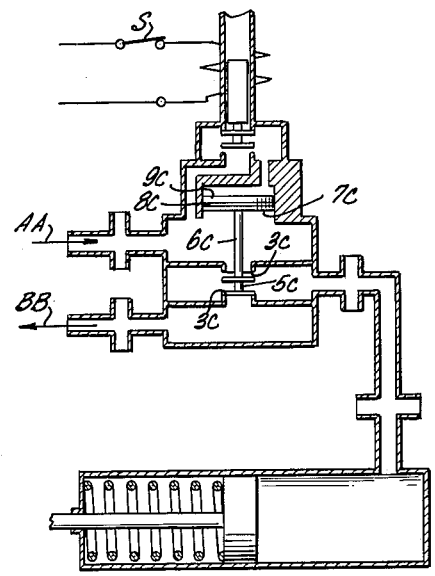

In Figs. 7 and 8 there is shown a conventional electromagnetic valve. Fig. 7 shows a longitudinal section through an electromagnetic valve with a double valve head $5c$ acting on upper and lower valve seats $3c$ respectively. In the position shown in Fig. 7 the valve head closes against the upper valve seat $3c$ in which position the magnet is cut off from the electric current. The valve housing has an inlet and an outlet to and from the cylinder which are controlled by the aforesaid double valve heads. A valve spindle $6c$ is connected to the latter and carries a servo-piston which consists of a disk $7c$ and piston $9c$ between which a sleeve-shaped seal $8c$ is located. The medium under pressure which is supplied to the valve housing, see arrow A, acts on valve head $5c$ as well as against servo-piston $9c$. In such case the servo-piston will be lifted until the upper surface of the valve head abuts against the upper valve seat. At the same time the valve housing is also connected to the outlet indicated by arrow BB.

The operation of the press is as follows:

When the main switch 56 has been actuated, the relay E is energized through the stationary or normally closed contact 101 of the (OFF) pushbutton switch and the stationary normally closed contacts 102, 103 of the two (ON) pushbuttons associated with a two-hand control. The relay B has a voltage applied thereacross through the working or normally open contact $e_1$ and the stationary or normally closed contacts $f_3$, $c_5$, $d_5$, $h_2$ and $i_2$, relay B holding itself through its contact $b_1$ and the normally closed rest contact $a_2$. The crank shafts 27 and 28 are now in their position "$a$" (Fig. 1). If the (ON) pushbuttons are now depressed, the relay F is energized through the working contacts 104, 105 of the (ON) pushbuttons. The energization circuit for the relay E is interrupted through opening of the normally closed rest contacts 102, 103 of the (ON) switches as is its connection with the energization circuit of the relay B through opening of the normally closed rest contact $f_2$. The relay F with its working or normally open contact $f_1$ which is now closed and through the contact $b_3$, also now closed, and the normally closed rest contact $e_2$ of the now deenergized relay E switches on the relays C and D which via contacts $c_1$ and $d_1$ (Fig. 5) actuate the electromagnetic control elements of the valve 40 arranged in the conduit 34 leading to the brake in such a manner that pressure medium flows into the cylinder 35 to release the brake 15. By means of the pressure increase in the conduit 34 the piston 58 of the pressure controller 41 is pressed by the spring 59 against the switching pin 60 so as to close a normally open working contact "$wbr$" arranged in the micro-switch 61. The contact "$wbr$" switches in relay J through the energization circuit for the relays C and D, which still has voltage applied across it, and through the closed contacts $c_3$ and $d_2$, the rest contact $w_1$ and the contact 55 associated with the cam 50.

The relay J switches by means of its contact $i_1$ the electro-magnetic actuating elements of the valve 42 arranged in the pressure conduit 36 which leads to the clutch 9 so as to open the valve 42. The clutch 9 is engaged by means of the pressure medium flowing into the cylinder 13 and upon increase of pressure in the conduit 36 the contact $w_2$ of the pressure controller 43 is opened, the contact $w_3$ remaining open as long as the conduit 36 is under pressure, i.e. as long as the clutch 9 is engaged.

The press is now driven at slow speed by the pair of gears 4 and 8 due to closing of the clutch 9. When the crank shafts have been rotated to the position "$b$" (Fig. 2) the cam 48 (Figs. 3, 6) mounted on the control shaft 37 rotating synchronously with the crank elements 27 and 28 closes the contact 53 so as to energize the relay G. The normally closed rest contact $g_1$ is opened and thus opens the energization circuit of the relay J which becomes deenergized and by means of its working or normally open contact $i_1$ opens the energization circuit for the valve 42 arranged in the pressure conduit 36 leading to the clutch 9. The valve 42 interrupts the connection with the pressure medium source or reservoir 63 and simultaneously vents the conduit 36 so that the clutch is disengaged by the action of suitable spring means (not shown). As soon as the conduit 36 has been relieved of pressure, the contact $w_2$ of the pressure controller 43 is again closed to energize the relay H when at the same time the contact 54 is closed by the cam 49. The working contact $g_2$ is, of course, closed when the relay G is energized.

The relay H energizes by means of its normally open working contact $h_1$ the control elements of the valve 38 arranged in the pressure conduit 33 leading to the clutch 10 so as to permit flow of the pressure medium through the conduit 33 for engaging the clutch 10. The crank shafts are now driven at higher speeds by means of the pair of gears 5 and 7, such high speeds being adapted for the idle or return stroke of the operating press. Through the pressure in the conduit 33 the contact $w_1$ of the pressure controller 45 is opened so that the energization circuit of the relay J is interrupted at a second location in addition to the location at contact $g_1$. In the circuits of the relays H and J are also arranged the contacts 54 and 55 which are actuated by the cams 49 and 50, respectively. The cams are so staggered with respect to each other that the contacts 54 and 55 are never closed at one and the same time, the cams being so adjusted on the cam shaft 37 that they open the then energized current circuit in timed relation and at the correct time, even in the event that the pressure controllers 43 and 45 fail to do so.

As long as the relays C and D are energized, at which time the brake is released, the relay A remains closed through its normally open working contact $a_1$ when it has once been switched in by the contact 51 actuated by the cam 46 and contacts $d_4$, $c_4$. The normally closed rest contact $a_2$ is open at this time. However, the relay B is retained in energized condition through the contact 52 actuated by the cam 47.

If the ram of the press now returns to its starting position, the cam 47 interrupts, through the intermediary of the switch 52, the energization circuit of the relay B, so that the latter becomes deenergized with its normally open working contact $b_2$ interrupting the energization circuit for the relays C, D, H and J. In this manner the engaged clutch 10 is disengaged and the brake conduit 34 vented, enabling the aforesaid disc brake 15 to the actuated by the springs 57 so as to immediately bring the ram to rest.

If during the stroke of the ram the (ON) buttons are released, contacts 104, 105 are opened, the relay F is deenergized and the relay E again energized, whereby the contacts $f_1$ and $e_2$ are opened, the energization of the brake relays C and D and of the clutch relay H or J interrupted so as to bring the ram to rest.

The aforesaid switch 56 is a key switch. In the illustrated position I the press may be manually operated in the manner described above. In the position III the press is arranged for continuous operation. In the position II the press operates as in the position I with the difference that upon releasing of the (ON) buttons the stroke of the press is not interrupted.

By adjusting the contour of cams 48, 49 and 50 it is possible to vary and adjust the instant of time in which the rapid traverse or idle stroke is interrupted and replaced by the slow traverse or operating stroke.

By virtue of the fact that the relays C and D associated with the brake are connected in parallel with one another, while their contacts are connected in series in the same current circuit, overrunning of the press in the event that one of these relays should remain energized upon switching off of the power is avoided.

The invention may be applied not only to presses having one brake and one or two clutches, but also to presses provided with a greater number of individually controlled clutches and brakes.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a power press and like machine tool provided with an operable element performing at least one cyclic operation; in combination, drive input shaft means, output shaft means, a gearing interconnecting said input shaft means with said output shaft means, said gearing including respective clutch means, brake means and meshing gears of predetermined speed ratios to move said operable element at relatively slow speed during one part of said cyclic operation and at relatively greater speed during another part of said cyclic operation, said clutch means being fluid pressure actuated and disposed on said output shaft means and operatively connected to said meshing gears, respectively, said brake means being fluid pressure actuated and carried by said output shaft means, respective conduit means operatively connected to said brake means and said clutch means, said conduit means carrying a pressure fluid medium for selective actuation of said clutch and brake means, electromagnetic valves and pressure control switches carried by said conduit means, an electric circuit including respective relays in communication with said electro-magnetic valves and said switches, a control shaft operatively connected to said operable element and coordinated with the movements of the latter, cam means supported by said control shaft and respectively actuating said relays in said electric circuit, so that upon actuation of said respective relays for said brake and clutch means, said brake and clutch means are selectively actuated and deactuated with respect to the movements of said operable element.

2. In a power press and like machine tool provided with an operable element performing at least one cyclic operation; in combination, driven input shaft means, output shaft means, a gearing interconnecting said input shaft means with said output shaft means, said gearing including respective meshing gears of predetermined speed ratios to move said operable element at relatively slow speed during one part of said cyclic operation and at relatively greater speed during another part of said cyclic operation, fluid pressure actuated clutch means disposed on said output shaft means, fluid pressure actuated brake means carried by said output shaft means, respective conduit means operatively connected to said brake means and said clutch means, said conduit means being adapted to supply a pressure fluid medium for selective actuation of said clutch and brake means, electro-magnetic valves and pressure control micro-switches connected with said conduit means, a spring biased piston which is acted on by said pressure fluid medium to actuate said micro-switches, electric circuit means including switch means and respective relays in registry with said electromagnetic valves, a control shaft operatively connected to said operable element and coordinated with the movements of the latter, and cam means supported by said control shaft and actuating the respective relays and predetermined switches of said electric circuit means, so that upon actuation of said respective relays said brake and clutch means are selectively actuated and deactuated with respect to the movement of said operable element, said brake means being engaged only when said clutch means are disengaged, to thereby prevent overheating of said brake means.

3. In a power-operated press provided with a press ram, speed change means operatively connected to said press ram and presenting a plurality of speed stages, said speed change means including speed change gear means for effecting a power stroke of said press ram means at a first speed and a return stroke at a second speed; respective fluid pressure actuated clutch means operatively connected with respective speed change gear means of said speed stages of said speed change means, control means operatively connected to said clutch means respectively, whereby one of said control means when actuating a predetermined clutch means effectuates operation of said press and press ram, so that the engagement of the remaining clutch means is withheld until said predetermined clutch means becomes disengaged via its coordinated control means, a fluid pressure actuated brake mechanism operatively connected to said press, and conduit means for a pressure medium and including control valves in registry with said respective clutch means and said brake mechanism for directing said medium to respective clutch means and brake mechanism, selectively, said control means being at least partially acted upon by said pressure medium and being operatively connected to the respective control valves.

4. In a power press according to claim 3, electric circuit means, said control valves for said pressure medium in said conduit means being electrically operated by said electric circuit means, said electric circuit means including an energizing circuit including contact means for each control valve, and pressure control means for operating said contact means.

5. In a power press according to claim 4, said pressure control means including a piston resiliently supported on said press, said pressure medium being conducted through said conduit means to act on said piston, and said contact member operatively connected with said piston for operating said electric circuit means to actuate said control valves.

6. In a power press according to claim 4, including a control shaft, said energizing circuit for said control valve including contact means operated by said control shaft so that individual clutch means will only be actuated within a predetermined range of the effective stroke of the operating press ram.

7. In a power press according to claim 4, said electric circuit means being provided with relays for controlling said brake and clutch means, said control means further including a control shaft operatively connected to said press ram, said control shaft being coordinated with the movements of the latter, cam means supported by said control shaft, said cam means selectively actuating said relays of said control means to thereby selectively engage and disengage said brake and clutch means in order to prevent engagement of said brake means until said clutch means have been disengaged, so that overheating of said brake means is avoided.

References Cited in the file of this patent
UNITED STATES PATENTS

| | | |
|---|---|---|
| 2,286,873 | Schwartz | June 16, 1942 |
| 2,286,943 | Verson | June 16, 1942 |
| 2,577,641 | Wissman | Dec. 4, 1951 |
| 2,682,941 | Hawley | July 6, 1954 |